United States Patent
de Pous et al.

(10) Patent No.: US 6,273,300 B2
(45) Date of Patent: *Aug. 14, 2001

(54) DEVICE FOR FASTENING OF A DISTRIBUTION COMPONENT ON A CONTAINER, AND PRODUCT DISTRIBUTION DEVICE WITH SUCH A FASTENING DEVICE

(75) Inventors: Olivier de Pous, Paris; Jacques Bergault, Tourville-la-Riviere; Stéphane Jumel, Remy, all of (FR)

(73) Assignee: Valois S.A., Le Neubourg ( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,782
(22) PCT Filed: Jun. 13, 1997
(86) PCT No.: PCT/FR97/01063
 § 371 Date: Sep. 16, 1999
 § 102(e) Date: Sep. 16, 1999
(87) PCT Pub. No.: WO97/48622
 PCT Pub. Date: Dec. 24, 1997

(30) Foreign Application Priority Data

Jun. 19, 1996 (FR) .................................................. 96 07599

(51) Int. Cl.$^7$ .................................................. B65D 88/54
(52) U.S. Cl. .................................... 222/321.9; 222/402.1; 222/568

(58) Field of Search .................. 222/321.1, 321.7–321.9, 222/402.1, 568; 285/94, 355

(56) References Cited

U.S. PATENT DOCUMENTS

| | | | |
|---|---|---|---|
| 2,730,273 | * 1/1956 | Smith | 222/568 |
| 3,002,770 | 10/1961 | Chestnut et al. | 285/94 |
| 3,568,746 | 3/1971 | Faroni et al. | 151/7 |
| 3,653,675 | * 4/1972 | Schaefer | 277/235 |
| 3,756,628 | * 9/1973 | St. Clair | 285/52 |
| 4,361,457 | 11/1982 | Keeler et al. | 156/224 |
| 4,828,295 | * 5/1989 | Plaquin et al. | 285/334 |
| 5,097,990 | 3/1992 | Goncalves | 222/153 |
| 5,106,130 | * 4/1992 | Ellsworth et al. | 285/355 |
| 5,398,975 | * 3/1995 | Simmons | 285/93 |
| 5,642,908 | * 7/1997 | Mascitelli | 222/321.7 |

FOREIGN PATENT DOCUMENTS

| | | |
|---|---|---|
| 665 608 | 3/1988 | (CH) . |
| 096 582A | 12/1983 | (EP) . |
| 359 605A | 3/1990 | (EP) . |

\* cited by examiner

*Primary Examiner*—Joseph A. Kaufman
(74) *Attorney, Agent, or Firm*—Rockey, Milnamow & Katz, Ltd.

(57) ABSTRACT

A metal fastening ring which can be screwed on for attaching a distribution component, such as a pump or a valve, on a container which has a neck and which contains product to be distributed. The ring includes a metal, interior, annular wall with internal threads which cooperate with external threads on the container neck. The ring has a plastic material coating on the threaded, interior, annular wall.

14 Claims, 1 Drawing Sheet

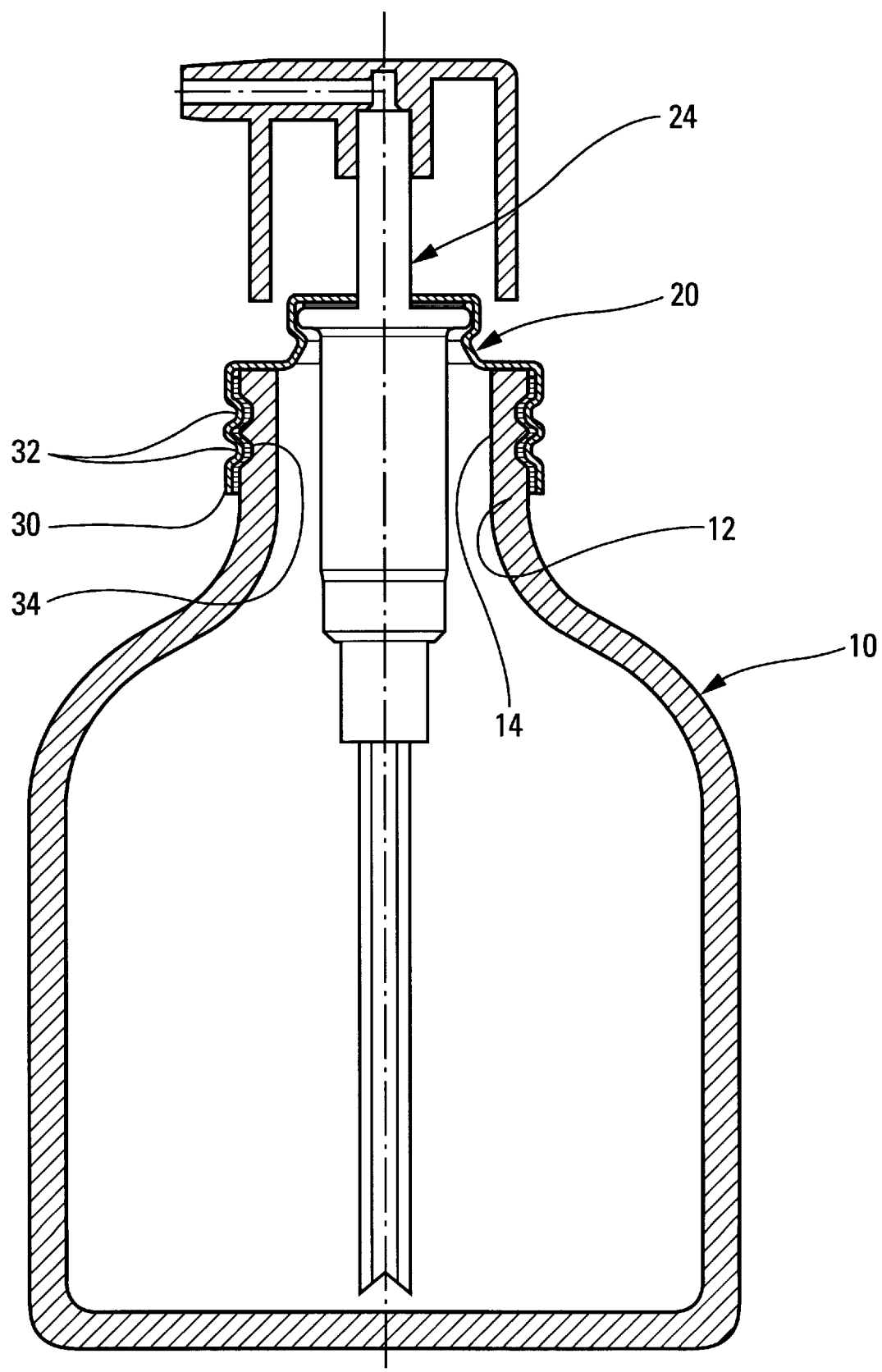

DEVICE FOR FASTENING OF A DISTRIBUTION COMPONENT ON A CONTAINER, AND PRODUCT DISTRIBUTION DEVICE WITH SUCH A FASTENING DEVICE

CROSS-REFERENCE TO RELATED APPLICATION

This application is an application filed under 35 U.S.C. Sec 371 as a national stage of international application PCT/FR97/01063, which was filed Jun. 19, 1997.

FIELD OF THE INVENTION

The invention relates to devices for attachment of distribution components on containers and more particularly to rings which can be screwed on, as well as to product distribution devices having such a fastening device.

BACKGROUND OF THE INVENTION

In order to attach distribution components, such as pumps or valves, on containers holding product which is to be distributed, a number of different techniques are available. Thus, it is possible to use a crimping cap which is intended to be crimped on the neck of the container. As an alternative, it is also possible to attach a distribution component by means of a fastening ring,.for example, a ring with tabs allowing it to be snapped on the neck of the container. Such a ring which can be snapped on is disclosed specifically in the document EP-0,359,605. According to yet another known technique, the distribution component is attached on the neck of a container by means of a ring which can be screwed on, the neck of the container having external threads which cooperate with the internal threads of the ring which can be screwed on. The invention relates more particularly to this last technique.

In the field of perfumery, but also in other fields, the containers, which can be produced out of any suitable materials, are however generally produced out of glass or sometimes metal. The use of screwable rings for attaching distribution components, pumps or valves presents a certain number of problems in the case of metal rings and particularly rings made of anodized aluminum.

On the one hand, because it is a matter of friction of a hard coating against a hard material, problems of irregularity of friction or seizing are created.

Moreover, the stresses are not very well distributed over the threads of the neck of the container, so that these threads risk being broken during assembly.

Furthermore, there is a risk of unscrewing of the ring in the case of vibrations, for example, during transport.

On the other hand, the size tolerances of the neck of the container, of the threads on the neck of the container or of the metal ring are very difficult to compensate for. Since the product distributors of this type are produced in very large numbers, said problems of tolerance compensation, which can appear during mounting of the ring on the neck of the container, prevent effective and economical mounting from the standpoint of time as well as cost.

The present invention therefore aims to provide a device for mounting of a distribution component on containers, such as a screwable ring, which does not have the aforementioned disadvantages.

SUMMARY OF THE INVENTION

The present invention therefore aims in particular to provide a metal fastening ring which can be screwed on, which essentially eliminates the problems of friction during screwing of the ring on the neck of the container.

The present invention also aims to provide a metal fastening ring which can be screwed on, which essentially eliminates the risk of breaking of the threads of the neck of the container during screwing of the ring.

The present invention furthermore aims to provide a metal fastening ring which can be screwed on, which does not risk coming loose accidentally because of vibrations and/or for which manual screwing/unscrewing is facilitated.

The present invention furthermore aims to provide a metal fastening ring which can be screwed on, which makes it possible to compensate for the manufacturing tolerances of the glass necks.

The present invention also aims to provide a metal fastening ring which can be screwed on, which is simple and inexpensive to manufacture and which makes it possible to limit assembly costs.

The invention therefore relates to a metal fastening ring which can be screwed on for attaching a distribution component, such as a pump or a valve, on a container which has a neck and which contains product to be dispensed, said ring having internal threads which cooperate with external threads provided on said neck of the container, said ring having a plastic material coating on the interior annular wall which has said threads.

This invention also relates to a product distribution device which includes a container, a distribution component, such as a pump or a valve, and a fastening device as defined above.

BRIEF DESCRIPTION OF THE DRAWING

In the accompanying drawing figure that forms part of the specification, there is shown in cross-sectional view a container with a threaded neck, a threaded metal fastening ring with a plastic material coating on the inside of the annular skirt of the ring (including on the internal threads), and a distribution device in the form a finger-actuated pump mounted in the container by the fastening ring.

DETAILED DESCRIPTION OF THE INVENTION

The drawing figure shows a container 10 having a neck 12 with exterior, male threads 14. A fastening ring 20 is mounted on the neck 12 of the container 10. The ring 20 attaches a distribution device 24, such as a valve (not shown) or such as a finger-operated pump 24, to the container 10. The ring 20 has an interior annular wall 30 which defines internal, female threads 32. At least the internal, female threads 32 of the ring 20 have a plastic material coating 34 applied thereto.

Preferably, said plastic material coating covers the entire interior annular wall of said ring.

Advantageously, said plastic material coating has a uniform thickness.

According to an advantageous embodiment, said plastic coating has a thickness less than approximately 0.2 mm.

Preferably, said plastic coating is a polyolefin film.

In particular, said polyolefin film is a polypropylene film or a polyethylene film, which are known for their resistance to solvents.

The container, and particularly its neck, can be made out of glass or metal.

Thus, by plasticizing the threads of the ring, this ring no longer has a hard coating on the surface, and during its mounting on the neck of the container, which is generally made of glass or metal, a seizing problem is no longer created. Likewise, the stresses on the threads of the containers are better distributed, and these threads no longer risk being broken. Furthermore, thanks to the thickness of said plastic material coating, problems of tolerance in the manufacturing of the neck, and particularly of its threads, can be compensated for by said plastic coating of the ring.

The main advantage of the present invention lies in the fact that the absence of the seizing problem, the tolerance problem and the risk of breaking the threads of the container makes possible a safe and effective assembly of the distributors in question, and prevents defective assembly from occurring because of said problems. This results in a lowering of the costs of production and assembly of said distributor. Another advantage is that the plastic coating ensures better fastening of the ring on the neck of the container, and the ring no longer risks coming loose because of vibrations, for example, during transport. Moreover, manual screwing/unscrewing is facilitated and made more pleasant by the presence of the plastic coating.

The invention therefore also makes it possible to produce a screwable fastening ring which by itself ensures a perfect attachment of the distribution component. In particular, the ring of the invention makes possible more economical manufacturing and assembly because it is no longer necessary, as is the case, for example, with rings which can be snapped on, to provide an additional element (hoop, external ring, etc.) in order to avoid unsnapping.

The plastic coating can, of course, be applied in any known manner, and the plastic material used can be of any suitable type. Advantageous materials are the polyolefins, such as polypropylene or polyethylene, which are preferably applied in the form of a thin film on the metal, which can be aluminum or tinned iron. The shaping of the piece can be done either before or after the deposition of the plastic film on the metal. Advantageously, the thickness of the coating is uniform and less than 0.1 mm, so that the above-mentioned advantages are obtained in an optimal manner.

What is claimed is:

1. A fastening device for fastening a distribution device onto a container having a neck provided with external male threads, the fastening device comprising a metal fastening ring having an interior, annular wall which has (1) internal female threads that are unitary with said annular wall, and (2) a plastic material coating applied to at least said internal female threads so as to adhere to said interior annular wall of said ring, the metal fastening ring being adapted to coact with a distribution device and to be threaded onto the neck of the container such that the plastic material coating is interposed between the internal female and external male threads.

2. The fastening device of claim 1 wherein the plastic material coating covers the entire interior, annular wall of the metal fastening ring.

3. The fastening device of claim 1 or 2 wherein the plastic material coating has a uniform thickness.

4. The fastening device of claim 1 or 2 wherein the plastic material coating has a thickness less than approximately 0.2 mm.

5. The fastening device of claim 3 wherein the plastic material coating has a thickness less than approximately 0.2 mm.

6. The fastening device of claim 1 or 2 wherein the plastic material coating is a polyolefin film.

7. The fastening device of claim 6 wherein the plastic material coating is a polypropylene or polyethylene film.

8. A product distribution device comprising: a container having a neck provided with external male threads, a distribution device, and a metal fastening ring having an interior, annular wall which has (1) internal female threads that are unitary with said annular wall, and (2) a plastic material coating applied to at least said internal threads so as to adhere to said interior annular wall of said ring, the metal fastening ring coacting with the distribution device and being threaded onto the neck of the container such that plastic material coating is interposed between the internal female and external male threads.

9. The product distribution device of claim 8 wherein the plastic material coating covers the entire interior, annular wall of the metal fastening ring.

10. The product distribution device of claim 8 or 9 wherein the plastic material coating has a uniform thickness.

11. The product distribution device of claim 8 or 9 wherein the plastic material coating has a thickness less than approximately 0.2 mm.

12. The product distribution device of claim 10 wherein the plastic material coating has a thickness less than approximately 0.2 mm.

13. The product distribution device of claim 8 or 9 wherein the plastic material coating is a polyolefin film.

14. The product distribution device of claim 13 wherein the plastic material coating is a polypropylene or polyethylene film.

* * * * *